United States Patent
Lee et al.

(10) Patent No.: US 12,046,942 B2
(45) Date of Patent: Jul. 23, 2024

(54) APPARATUS FOR CONTROLLING BATTERY CIRCUIT, VEHICLE HAVING THE SAME, AND CONTROL METHOD THEREOF

(71) Applicants: Hyundai Motor Company, Seoul (KR); Kia Corporation, Seoul (KR)

(72) Inventors: Seung Chan Lee, Seoul (KR); Jung Ui Jung, Hwaseong-si (KR); Kwang Kyu Park, Busan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 10 days.

(21) Appl. No.: 18/111,802

(22) Filed: Feb. 20, 2023

(65) Prior Publication Data
US 2023/0378790 A1 Nov. 23, 2023

(30) Foreign Application Priority Data
May 20, 2022 (KR) .................. 10-2022-0061899

(51) Int. Cl.
*H02J 7/00* (2006.01)
*H02M 3/335* (2006.01)

(52) U.S. Cl.
CPC ............ *H02J 7/007* (2013.01); *H02J 7/0063* (2013.01); *H02M 3/33573* (2021.05); *H02J 2207/20* (2020.01)

(58) Field of Classification Search
CPC . G07C 5/06; G07C 5/12; B60R 16/033; H02J 7/00; H02J 7/007; H02J 7/0063; H02J 2207/20; H02M 3/33573
See application file for complete search history.

(56) References Cited

U.S. PATENT DOCUMENTS

2016/0163127 A1* 6/2016 Kim ................ G01R 31/52
701/36

* cited by examiner

*Primary Examiner* — Robert L Deberadinis
(74) *Attorney, Agent, or Firm* — Banner & Witcoff, Ltd.

(57) ABSTRACT

Provide is an apparatus for controlling a battery circuit, a vehicle having the same, and a control method thereof, the apparatus including: a power supply including at least one battery, and at least two low voltage DC-DC Converters (LDCs) electrically connected to the battery and configured to drop an input voltage and supply the voltage to one of a first load and a second load; and a controller including a processor configured to process a signal received from the LDC, wherein the controller is configured to, based on the signal received from the LDC being processed, identify a failure of at least one of the LDCs; and in response to the failure being identified, control a LDC other than the LDC, of which the failure is identified.

18 Claims, 11 Drawing Sheets

APPARATUS FOR CONTROLLING BATTERY CIRCUIT, VEHICLE HAVING THE SAME, AND CONTROL METHOD THEREOF

CROSS-REFERENCE TO RELATED APPLICATION

This application is based on and claims priority under 35 U.S.C. § 119 to Korean Patent Application No. 10-2022-0061899, filed on May 20, 2022 in the Korean Intellectual Property Office, the disclosure of which is incorporated herein by reference.

BACKGROUND

1. Field

The disclosure relates to an apparatus for controlling a battery circuit, a vehicle having the same, and a control method thereof, and more specifically, to an apparatus and method for controlling a battery circuit of a vehicle when a failure occurs.

2. Discussion of the Background

An eco-friendly vehicle includes a vehicle that is driven using electricity, and generally includes a high voltage battery for driving the vehicle. An eco-friendly vehicle equipped with a high voltage battery may use a low voltage DC-DC converter (LDC) that converts the voltage of the high voltage battery to a low voltage to supply power to electronic parts installed in the vehicle.

An autonomous driving vehicle includes a vehicle that performs autonomous driving to a destination by controlling acceleration/deceleration, steering, etc. of the vehicle using autonomous driving capabilities without an intervention of an occupant or a passenger. In order to travel to the destination without an occupant intervention even when a failure occurs during autonomous driving, there is a need to employ a fail operational system (e.g., a system that addresses a failure of a device and/or a failure a vehicle, such as a failure of one or more vehicle parts). In particular, in the case of an eco-friendly vehicle driven by electricity, it may need to implement a fail operational system according to a failure in parts related to a battery of an electronic system. Accordingly, there is a need to develop a fail operational technology that may address a failure in the battery-related part of an electric vehicle system of an eco-friendly vehicle driven by electricity.

SUMMARY

The following summary presents a simplified summary of certain features. The summary is not an extensive overview and is not intended to identify key or critical elements.

The present disclosure may provide an apparatus and method for controlling a battery circuit of a vehicle when a failure occurs.

The present disclosure may provide an apparatus and method for controlling a battery circuit of a vehicle that are capable of realizing a fail operational system of an autonomous driving eco-friendly vehicle by duplicating a power supply circuit.

The present disclosure may provide an apparatus and method for controlling a battery circuit of a vehicle that are capable of minimizing cost rise due to a circuit redundancy configuration by optimizing a circuit transition between a normal operation state and a failure occurrence state and a configuration of components.

The present disclosure may provide an apparatus and method for controlling a battery circuit of a vehicle that are capable of reinforcing a fail operational system of an autonomous driving eco-friendly vehicle through a redundancy configuration of a power supply circuit.

The present disclosure may provide an apparatus and method for controlling a battery circuit of a vehicle that are capable of travelling to a destination without occupant's intervention even when electronic parts of an autonomous driving eco-friendly vehicle have a failure.

The technical objectives of the disclosure are not limited to the above, and other objectives may become apparent to those of ordinary skill in the art based on the following descriptions.

An apparatus may comprise: a power supply comprising at least one battery and a plurality of low voltage DC-DC converters (LDCs), wherein each of the plurality of LDCs is electrically coupled to the battery and is configured to drop a voltage and to supply the dropped voltage to one of a plurality of loads, wherein the plurality of loads comprises a first load and a second load; and a controller configured to: receive a signal from at least one of the plurality of LDCs; based on the signal received from the at least one of the plurality of LDCs, identify a failure associated with the at least one of the plurality of LDCs; and based on the identified failure, control an additional LDC other than the plurality of LDCs to supply power to a load of the plurality of loads that is associated with the at least one of the plurality of LDCs.

The power supply may comprise: a first switch connected between the first load and a first LDC of the plurality of LDCs; a second switch connected between the second load and a second LDC of the plurality of LDCs; and a third switch, wherein the controller is configured to: based on the identified failure, control the third switch to electrically couple the additional LDC to the first load or the second load.

The plurality of LDCs may comprise a first LDC for supplying a voltage to the first load, a second LDC for supplying a voltage to the second load, and the additional LDC in an initially idle state; wherein the apparatus comprises a switch; and wherein the controller is configured to: based on an identified failure of one of the first LDC and the second LDC, control the switch to electrically couple the additional LDC to the one of the first load and the second load.

The plurality of LDCs may comprise a first LDC configured to supply a voltage to the first load and a second LDC configured to supply a voltage to the second load, wherein the additional LDC is configured to supply a voltage to a third load; wherein the apparatus comprises a switch; and wherein the controller is configured to control the additional LDC by: based on an identified failure of the second LDC, controlling the additional LDC to supply a voltage to the second load.

The controller may be configured to: based on an identified failure of the first LDC, generate a control signal to turn on a first switch element of the switch connected between the additional LDC and the first load, and to turn off a second switch element of the switch connected between the additional LDC and the second load.

The controller may be configured to: based on an identified failure of the second LDC, generate a control signal to turn off a first switch element of the switch connected between the additional LDC and the first load, and to turn on a second switch element of the switch connected between the additional LDC and the second load.

The power supply may further comprise: a power storage provided at a voltage input terminal of each of the first load and the second load.

The power supply may further comprise: an amplifier configured to receive the signal received from the at least one of the plurality of LDCs as an input, and to output an output signal to the controller, wherein the amplifier comprises a positive feedback comparator.

The controller may be configured to: generate, based on a type of the first load or the second load, a control signal to change a duty rate of an input voltage of an LDC of the plurality of LDCs.

A method may comprise: receiving at least one signal from a plurality of low voltage DC-DC converters (LDCs); based on the at least one signal, identifying a failure of at least one of the plurality of LDCs; and based on the identified failure, controlling, by a controller, an additional LDC other than the plurality of LDCs to supply power to a load associated with the at least one of the plurality of LDCs.

The method may further comprise based on the identified failure, controlling a switch to electrically couple the additional LDC to the load.

The method may further comprise supplying a voltage from a first LDC of the plurality of LDCs to the load; supplying a voltage from a second LDC of the plurality of LDCs to a second load; operating the additional LDC in an initially idle state; and based on an identified failure of one of the first LDC and the second LDC, controlling a switch to electrically couple the additional LDC to the one of the load and the second load.

The method may further comprise supplying a voltage from a first LDC of the plurality of LDCs to the load; supplying a voltage from a second LDC of the plurality of LDCs to a second load; supplying a voltage from the additional LDC to a third load; and based on an identified failure of the second LDC, controlling the additional LDC to supply a voltage to the second load.

The method may further comprise based on an identified failure of the first LDC, generating a control signal to turn on a first switch element of the switch connected between the additional LDC and the load, and to turn off a second switch element of the switch connected between the additional LDC and the second load.

The method may further comprise based on an identified failure of the second LDC, generating a control signal to turn off a first switch element of the switch connected between the additional LDC and the load, and to turn on a second switch element of the switch connected between the additional LDC and the second load.

The method may further comprise providing, by a power storage, power to the load via an input terminal of the load.

The method may further comprise receiving, by an amplifier, the at least one signal as an input; and outputting, by the amplifier, an output signal to the controller, wherein the amplifier comprises a positive feedback comparator.

The method may further comprise generating, based on a type of the load, a control signal to change a duty rate of an input voltage of the at least one of the plurality of LDCs.

These and other features and advantages are described in greater detail below.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
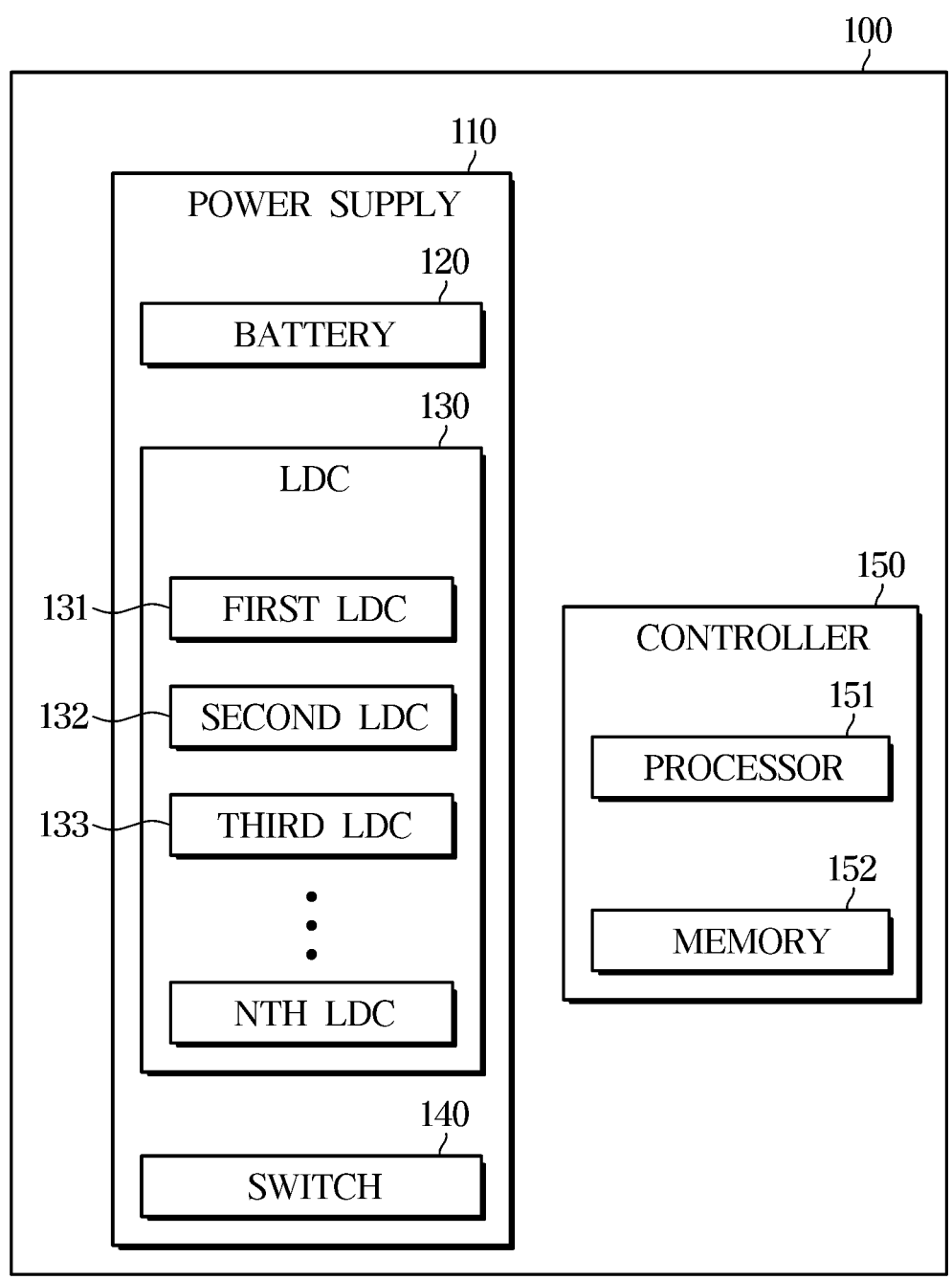
FIG. 1 is a block diagram illustrating a configuration of an apparatus for controlling a battery circuit.

Like numerals refer to like elements throughout the specification. Not all elements and features of the present disclosure will be described, and description of what are commonly known in the art or what overlap each other in the examples will be omitted. The terms such as "~part", "~module", "~member", "~block" or the like may be implemented in software and/or hardware, and a plurality of "~parts", a plurality of "~modules", a plurality of "~members", a plurality of "~blocks" or the like may be implemented as one component, or may include a plurality of components.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, operations, operations, elements, and/or components, but do not preclude the presence or addition of one or more other features, integers, operations, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

A singular expression includes plural expression unless the context clearly dictates otherwise.

Reference numerals used for method operations are just used for convenience of explanation, but not to limit an order of the operations. Thus, unless the context clearly dictates otherwise, the written order may be practiced otherwise.

A vehicle may include a transportation device that may travel on a road or track. Hereinafter, for the sake of convenience of description, the vehicle will be illustrated in relation to a four-wheeled vehicle as an example. However, aspects of the vehicle are not limited thereto.

The vehicle may include a body including an exterior of the vehicle and a frame of the vehicle carrying people and/or cargo (for example, an engine room, a trunk, a bumper, a roof, a flank, a floor, etc.) and a chassis including devices required for the vehicle to travel, for example, an engine and/or a motor, a power transmission device, a steering device, a brake, and the like.

General descriptions of the body and chassis of the vehicle will be omitted.

An apparatus 100 for controlling a battery circuit may be implemented inside or outside the vehicle. The apparatus 100 for controlling a battery circuit may be integrally formed with controller inside the vehicle, or may be implemented as a separate hardware device and connected to controllers of the vehicle by a connection member.

For example, the apparatus 100 for controlling a battery circuit of the vehicle may be implemented integrally with the vehicle, may be implemented as a configuration separate from the vehicle and installed/attached to the vehicle, or the apparatus 100 for controlling a battery circuit may have some parts implemented integrally with the vehicle and other parts implemented as a configuration separate from the vehicle and installed/attached to the vehicle.

Hereinafter, the operating principles and various examples of the disclosure will be described with reference to the accompanying drawings.

FIG. 1 is a block diagram illustrating a configuration of an apparatus for controlling a battery circuit.

Referring to FIG. 1, the apparatus 100 for controlling a battery circuit of a vehicle may include a power supply 110 and a controller 150.

The power supply 110 may include at least one battery 120, at least one low voltage DC-DC converter (LDC) 130, and a switch 140.

The battery 120 may be provided in a vehicle to provide power to a motor that generates driving force of the vehicle. For example, the battery 120 may be a high voltage battery and may include an auxiliary battery. The battery 120 may output a voltage of, for example, 600 to 800V.

For example, the vehicle equipped with the apparatus 100 for controlling a battery circuit may include an autonomous driving environment-friendly vehicle.

The battery 120 may be connected to at least one LDC 130. The connection may refer to a state in which one end of the battery is electrically connected to one end of the LDC 130 and thus supply of a voltage is allowable.

For example, the LDC 130 may include at least one LDC. The LDC 130 may include a first LDC 131, a second LDC 132, a third LDC 133, and the like. The LDCs 131, 132, and 133 may be electrically connected to the battery 120 and drop a voltage supplied from the battery 120 and output the voltage.

For example, the LDC 130 may include a high voltage terminal electrically connected to the battery 120 and a low voltage terminal for dropping the voltage supplied from the battery 120 and outputting the voltage. The low voltage terminal of the LDC 130 may be connected to one of a first load and a second load, to drop the voltage input from the battery 120 and supply the one of the first and second loads with the dropped voltage.

The LDC 130 may drop (convert) the voltage input from the battery at the high voltage terminal and output a voltage of, for example, 24V and/or 12V to the low voltage terminal.

In an example, the LDC 130 may be implemented in a structure in which a half/full-bridge converter and a rectifier are connected to each other. However, the structure of the LDC 130 is not limited thereto, and may adopt the other LDC structures and LDC structures to be developed in the future.

The switch 140 may turn on and/or off the connection between the low voltage terminal of the LDC 130 and the first load and/or the second load. The switch 140 may include at least one switch (e.g., switches 141, 142, 143 shown in FIG. 2) to turn on and/or off the connection between the low voltage terminal of the LDC 130 and the first load, or turn on and/or off the connection between the low voltage terminal of the LDC 130 and the second load. The switch 140 may operate (on or off) according to a control signal from the controller 150.

Accordingly, the switch 140 may selectively supply the voltage output from the low voltage terminal of the LDC 130 to the first load and the second load.

The switch 140 may be provided at the low voltage terminal of each of the LDCs 130 included in the apparatus 100 for controlling a battery circuit, to turn on and/or off connection to the first load and/or the second load according to the control signal of the controller 150. In this case, the convenience of parts management may be improved. However, aspects of the disclosure are not limited thereto.

In another example, the switches 140 may be provided at the low voltage terminals of some of the LDCs included in the apparatus 100 for controlling a battery circuit. Since the switches 140 are provided at some of the low voltage terminals of the LDCs rather than at all of the low voltage terminals of the LDCs 130, cost reduction may be achieved.

The controller 150 may include at least one processor 151 and a memory 152. For example, the controller 150 may include an electronic control unit (ECU), a micro control unit (MCU), and/or other sub-control unit mounted in a vehicle.

The processor 151 may refer to a central processing unit (CPU) and/or at least one dedicated processor on which operations and/or methods performed by an apparatus described herein are performed.

For example, the processor 151 may process a signal received from the LDC 130. Accordingly, the processor 151 may, based on the signal received from the LDC 130 being processed, identify whether at least one LDC included in the LDCs 130 (e.g., 131, 132, 133, and so on) is in failure.

The processor 151 may, in response to a failure of the at least one LDC being identified, generate a control signal for controlling LDCs other than the LDC, of which the failure is identified. The control signal for controlling the LDC may include a control signal for turning on and/or off the operation of the LDC, and/or a control signal for turning on and/or off the switch 140, and/or a control signal for controlling to change the duty rate (e.g., a duty cycle) of the voltage supplied to the LDC.

The processor 151 may execute a program command (e.g., instructions) stored in the memory 152.

The memory 152 may include a volatile storage medium and/or a non-volatile storage medium. For example, the memory 152 may include a read only memory (ROM) and/or random access memory (RAM).

The memory 152 may store at least one command. More specifically, the memory 152 may store at least one command executed by the processor 151.

As described above, the memory 152 may include at least one command. The memory 152 may include a command for controlling the operation (on and/or off) of the LDC, a command for controlling the operation (on and/or off) of the switch, a command for changing the duty rate of the voltage, and the like.

For example, the memory 152 may include a command for controlling the operation (on and/or off) of the first LDC 131, the second LDC 132, the third LDC 133, and the fourth LDC (not shown) and may include a command for controlling the operation (on and/or off) of the switch connected to each of the low voltage terminals of the LDC. However, aspects of the disclosure are not limited thereto. Accordingly, the memory 152 may include commands related to an operation to be described below, and the processor 151 may execute a program related to the above-described operations and/or operations to be described below.

The memory 152 may store at least one data calculated by the execution of the processor 151.

With reference to FIGS. 2 to 10, the configurations of the apparatus 100 for controlling a battery circuit will be described according to respective examples of implementation.

Figure 2:
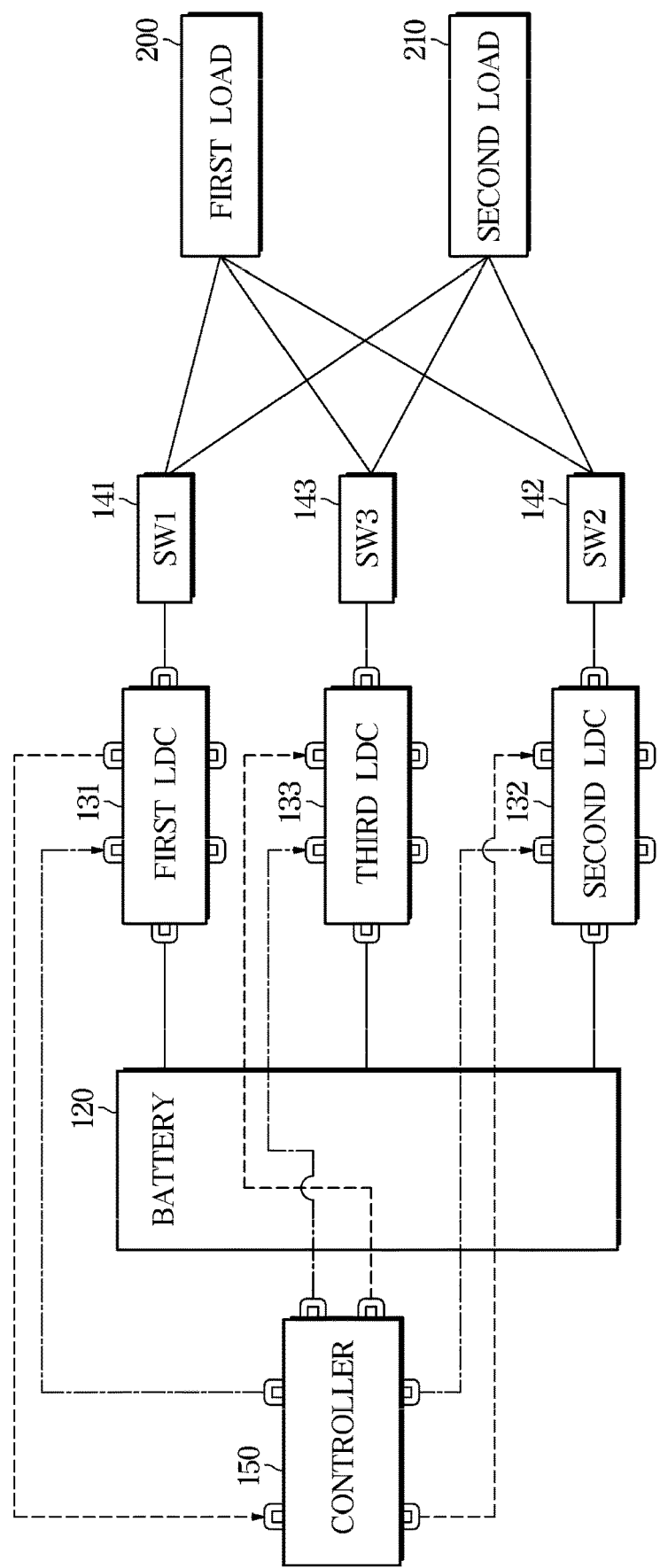
FIG. 2 is a conceptual diagram illustrating a configuration of an apparatus for controlling a battery circuit.

FIG. 2 is a conceptual diagram illustrating a configuration of an apparatus for controlling a battery circuit.

Referring to FIG. 2, the apparatus 100 for controlling a battery circuit may be an apparatus for controlling a battery circuit according to a first example of implementation.

The apparatus 100 may include: a power supply 110 including a battery 120; a first LDC 131, a second LDC 132, and a third LDC 133; a first switch 141, a second switch 142, and a third switch 143; a controller 150; and a first load 200 and a second load 210.

The first switch 141 may be connected between the first LDC 131 and each of the first load 200 and the second load 210 to electrically connect the first LDC 131 to one of the first load 200 and the second load 210 according to a control signal of the controller 150. The second switch 142 may be connected between the second LDC 132 and each of the first load 200 and the second load 210 to connect the second LDC 132 to one of the first load 200 and the second load 210 according to a control signal of the controller 150, and the third switch 143 may be connected between the third LDC 133 and each of the first load 200 and the second load 210 to connect the third switch 143 to one of the first load 200 and the second load 210 according to a control signal of the controller 150.

The controller 150 may receive signals from the first LDC 131 and the second LDC 132. The signal(s) may include, for example, a failure signal (e.g., a failure indication signal) of the first LDC 131 and/or the second LDC 132.

The controller 150 may, based on the signals received from the first LDC 131 and the second LDC 132 being processed, identify a failure of the first LDC 131 and/or the second LDC 132. The controller 150 may, in response to a failure of the first LDC 131 and/or the second LDC 132 being identified, control the remaining LDCs, except for the LDC(s) of which the failure is identified.

For example, the controller 150 may, in response to a failure of the first LDC 131 being identified, generate a control signal for operating the third LDC 133 in an idle state. The controller 150 may generate a signal for controlling the third switch 143 so that the third LDC 133 supplies a voltage to a load to which the first LDC 131 has been supplying a voltage.

For example, the controller 150 may, in response to identifying a failure of the first LDC 131 that has been supplying a voltage to the second load 210, generate a control signal for operating the third LDC 133 (e.g., which was in an idle state) and generate a control signal for controlling the third switch 143 to connect the second load 210 and the third LDC 133. However, aspects of the disclosure are not limited thereto.

As another example, the controller 150 may, in response to a failure of the second LDC 132 that has been supplying a voltage to the second load 210, generate a control signal for operating the third LDC 133 (e.g., which was in an idle state) and generate a control signal for controlling the third switch 143 to connect the second load 210 and the third LDC 133. As described above, the apparatus 100 for controlling a battery circuit may connect an LDC (e.g., which was in an idle state), so that the LDC performs the operation of another LDC, of which a failure is identified, with respect to a load, thereby implementing a fail operational system (e.g., a failure recovery system, such as a system for recovering a power supply failure and/or for recovering a power converter failure).

Since the apparatus 100 for controlling a battery circuit includes the switches 140 at low voltage terminals of all LDCs so as to be connected to the first load 200 or the second load 210, improvement on parts management may be provided, and development man-hours may be remarkably reduced.

Figure 3:
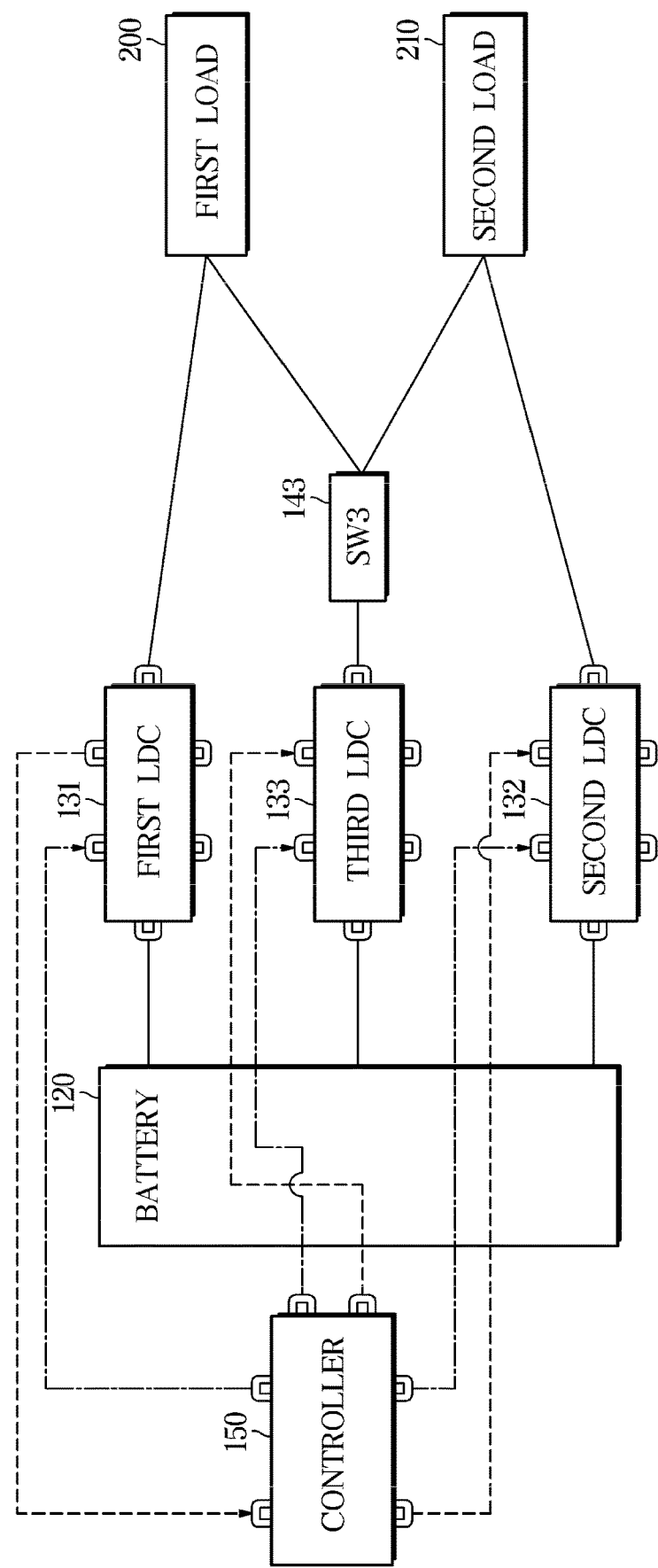
FIG. 3 is a conceptual diagram illustrating a configuration of an apparatus for controlling a battery circuit.

FIG. 3 is a conceptual diagram illustrating a configuration of an apparatus for controlling a battery circuit.

Referring to FIG. 3, the apparatus 100 for controlling a battery circuit may be an apparatus for controlling a battery circuit according to a second example of implementation.

The apparatus 100 for controlling a battery circuit may include: a power supply 110 including a battery 120; a first LDC 131, a second LDC 132, and a third LDC 133; a third switch 143; a controller 150; and a first load 200 and a second load 210.

The third switch 143 may connect the third LDC 133 to one of the first load 200 and the second load 210.

The controller 150 may receive signals from the first LDC 131 and the second LDC 132. The signal(s) may include, for example, a failure signal of the first LDC 131 and/or the second LDC 132.

The controller 150 may, based on the signal(s) received from the first LDC 131 and/or the second LDC 132 being processed, identify a failure of the first LDC 131 and/or the second LDC 132. The controller 150 may, in response to the failure of the first LDC 131 and/or the second LDC 132 being identified, control the third LDC 133 that may be in an idle state.

For example, the controller 150 may, in response to a failure of the first LDC 131 being identified, generate a control signal for operating the third LDC 133 (e.g., in an idle state). The controller 150 may generate a signal for controlling the third switch 143 so that the third LDC 133 supplies a voltage to a load (e.g. the first load 200) to which the first LDC 131 has been supplying a voltage.

For example, the controller 150 may, in response to identifying a failure of the first LDC 131, which has been supplying a voltage to the first load 200, generate a control signal for operating the third LDC 133 (e.g., in an idle state) and generate a control signal for controlling the third switch 143 to connect the first load 200 and the third LDC 133. However, aspects of the disclosure are not limited thereto.

As described above, the apparatus 100 for controlling a battery circuit may connect an LDC (e.g., in an idle state), so that the LDC performs the operation of another LDC having a failure, with respect to a load, thereby implementing a fail operational system (e.g., a failure recovery system).

Figure 4:
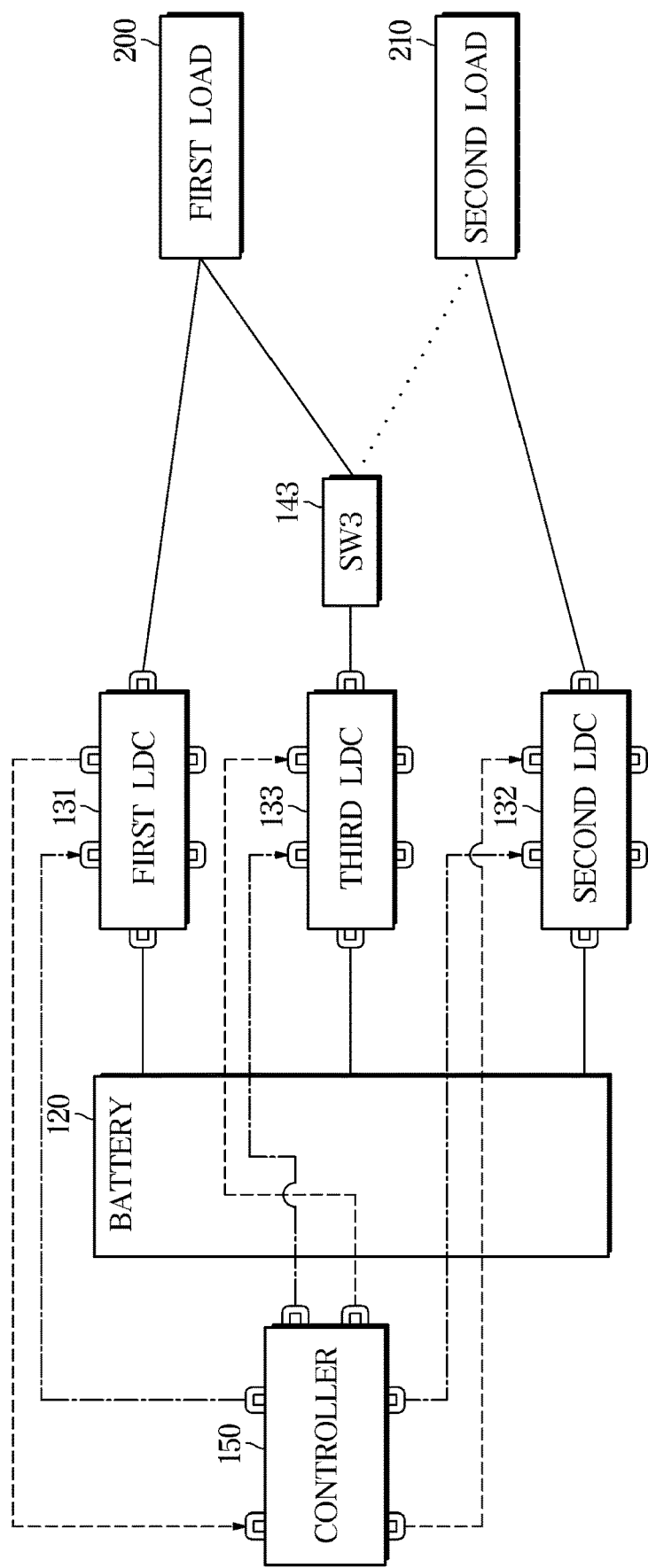
FIG. 4 is a conceptual diagram illustrating a configuration of an apparatus for controlling a battery circuit.

FIG. 4 is a conceptual diagram illustrating a configuration of an apparatus for controlling a battery circuit.

Referring to FIG. 4, the apparatus 100 for controlling a battery circuit according to an embodiment of the present disclosure may be an apparatus for controlling a battery circuit according to a third example of implementation.

The apparatus 100 for controlling a battery circuit may include: a power supply 110 including a battery 120; a first LDC 131, a second LDC 132, and a third LDC 133; a third switch 143; a controller 150; and a first load 200 and a second load 210.

Since the apparatus 100 for controlling a battery circuit has a configuration similar to that of the apparatus 100 for controlling a battery circuit shown in FIG. 3, the following description will be made in relation to the difference between the two examples of implementation.

The first to third LDCs 131, 132, and 133 may drop the voltage input from the battery 120 and supply the voltage to the first load 200 and/or the second load 210.

For example, the first LDC 131 may have a low voltage terminal thereof electrically connected to the first load 200 to supply a voltage to the first load 200. The first LDC 131 may supply a voltage to a load having a preset high priority among the first loads.

The second LDC 132 may have a low voltage terminal thereof electrically connected to the second load 210 to supply a voltage to the second load 210. The second LDC 132 may supply a voltage to the second load 210.

The third LDC 133 may have a low voltage terminal thereof electrically connected to the first load 200 to supply a voltage to the first load 200. The third LDC 133 may supply a voltage to a load having a preset low priority among the first loads.

In this case, the controller 150 may, in response to a failure of the first LDC 131 being identified, generate a control signal so that the third LDC 133 may supply a voltage even to a load having a preset high priority among the first loads. However, aspects of the disclosure are not limited thereto.

In another example, the controller 150 may, in response to a failure of the second LDC 132 being identified, generate a control signal so that the third LDC 133 may supply a voltage to the second load 210. In this case, the controller 150 may generate a control signal so that the first LDC 131 may supply a voltage even to a load having a preset low priority among the first loads.

The preset priority may be set according to ECUs and/or devices that are used for autonomous driving of the autonomous driving vehicle.

A load having a preset high priority may include a drive motor, a vehicle controller, and/or a sensor of certain types (e.g., the priority of the sensor may be higher than priorities of one or more sensors of other types). The load having a high priority may include at least one of: a camera, a radar, a light detection and ranging (LiDAR), and/or an ultrasonic sensor for obtaining information of surroundings of the vehicle in connection with autonomous driving of the vehicle.

A load having a preset low priority may include a vehicle interior lamp, an air conditioner, and/or a motor provided in a seat. The load having a preset low priority may include a component determined to have a low degree of relevance to autonomous driving or travelling of the vehicle according to a preset criterion.

Accordingly, the apparatus 100 for controlling a battery circuit may reduce the burden on the first LDC 131 that supplies a voltage to the first load 200 to reduce the risk of failure of the first LDC 131, and in response to a failure of the first LDC 131 or the second LDC 132, connect the third LDC 133, to implement a fail operational system.

The apparatus 100 for controlling a battery circuit may include: a power supply 110 including a battery 120; a first LDC 131, a second LDC 132, a third LDC 133, and a fourth LDC (not shown); a controller 150; and a first load 200 and a second load 210.

In this case, the controller 150 may, in response to a failure of the first LDC 131 being identified, generate a control signal for operating the third LDC 133, and generate a control signal for turning off the operation of the first LDC 131.

Similarly, the controller 150 may, in response to a failure of the second LDC 132 being identified, generate a control signal for operating the fourth LDC (not shown), and generate a control signal for turning off the operation of the second LDC 132 (not shown).

That is, the apparatus 100 for controlling a battery circuit may include the third LDC 133 and the fourth LDC (not shown) that may, in response to identifying a failure of the first LDC 131 and the second LDC 132 configured to supply the first load 200 and the second load 210 with voltages, respectively, supply a voltage instead of the first LDC 131 and the second LDC 132.

Figure 5:
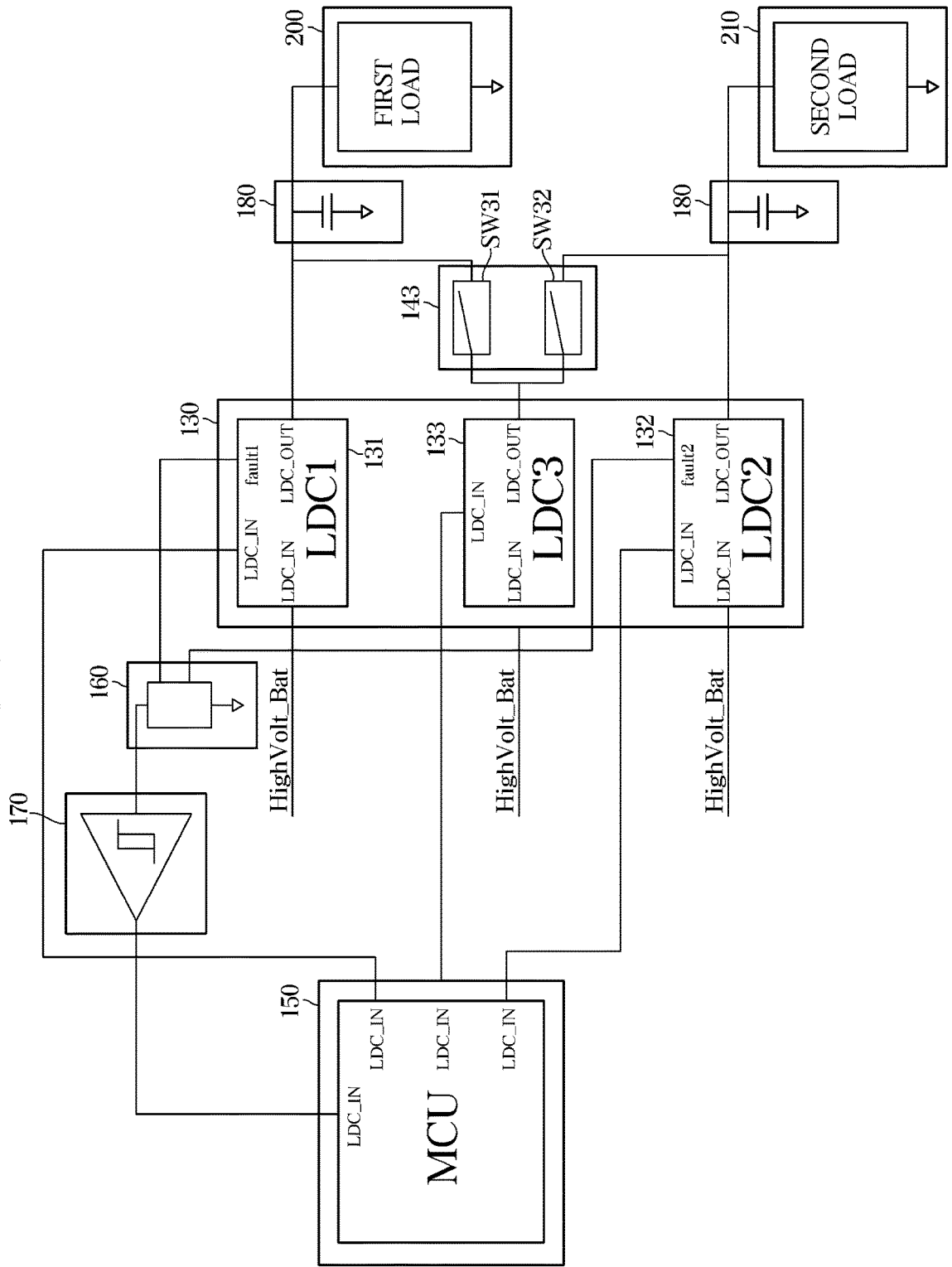
FIG. 5 is a circuit diagram illustrating an apparatus for controlling a battery circuit.

FIG. 5 is a circuit diagram illustrating an apparatus for controlling a battery circuit. FIG. 5 may be a circuit diagram according to the third example of implementation of an apparatus 100 for controlling a battery circuit shown in FIG. 4. However, aspects of the disclosure are not limited thereto.

Referring to FIG. 5, the apparatus 100 for controlling a battery circuit may further include a composite resistor 160, an output circuit 170, and a power storage 180.

The third switch 143 may be implemented with at least two switches SW31 and SW32 (e.g., switch elements of the third switch 143). The controller 150 may generate a control signal for turning on the switch SW31 and turning off the switch SW32, thereby connecting the third LDC 133 and the first load 200. In the opposite case, the controller 150 may generate a control signal for turning off the switch SW31 and turning on the switch SW32, thereby connecting the third LDC 133 and the second load 210.

The composite resistor 160 may be a resistor in which a plurality of resistors are connected in parallel. The composite resistor 160 may be connected to the first LDC 131 and the second LDC 132, and a value output from the resistor 160 may be changed according to signals received from the first LDC 131 and the second LDC 132.

The output circuit 170 may be electrically connected to the composite resistor 160 and the controller 150. Accordingly, the voltage input through the composite resistor 160 may be output to the controller 150 through the output circuit 170. For example, the output circuit 170 may include an Op-amp.

A voltage corresponding to the resistance value of the composite resistor 160 may be input to the output circuit 170, and the voltage may be amplified and output to the controller 150.

Accordingly, the controller 150 may identify a failure of the first LDC 131 and/or the second LDC 132 based on the voltage received from the output circuit 170.

On the other hand, the output circuit 170 may further include a positive feedback comparator to prevent signal interference from occurring due to electromagnetic interference (EMI), which may be generated from a magnetic field (magnetic flux) flowing in a transforming core included in the LDC. In this case, the output circuit 170 may minimize signal interference through hysteresis to improve the reliability and stability of the apparatus 100 for controlling a battery circuit.

The power storage 180 may include capacitors connected in parallel to input terminals of the first load 200 and the second load 210. Accordingly, the power storage 180 may supply the power stored in the power storage 180 to the first load 200 and/or the second load 210 when the power supply is temporarily stopped due to a failure of the LDC 130.

Figure 6:
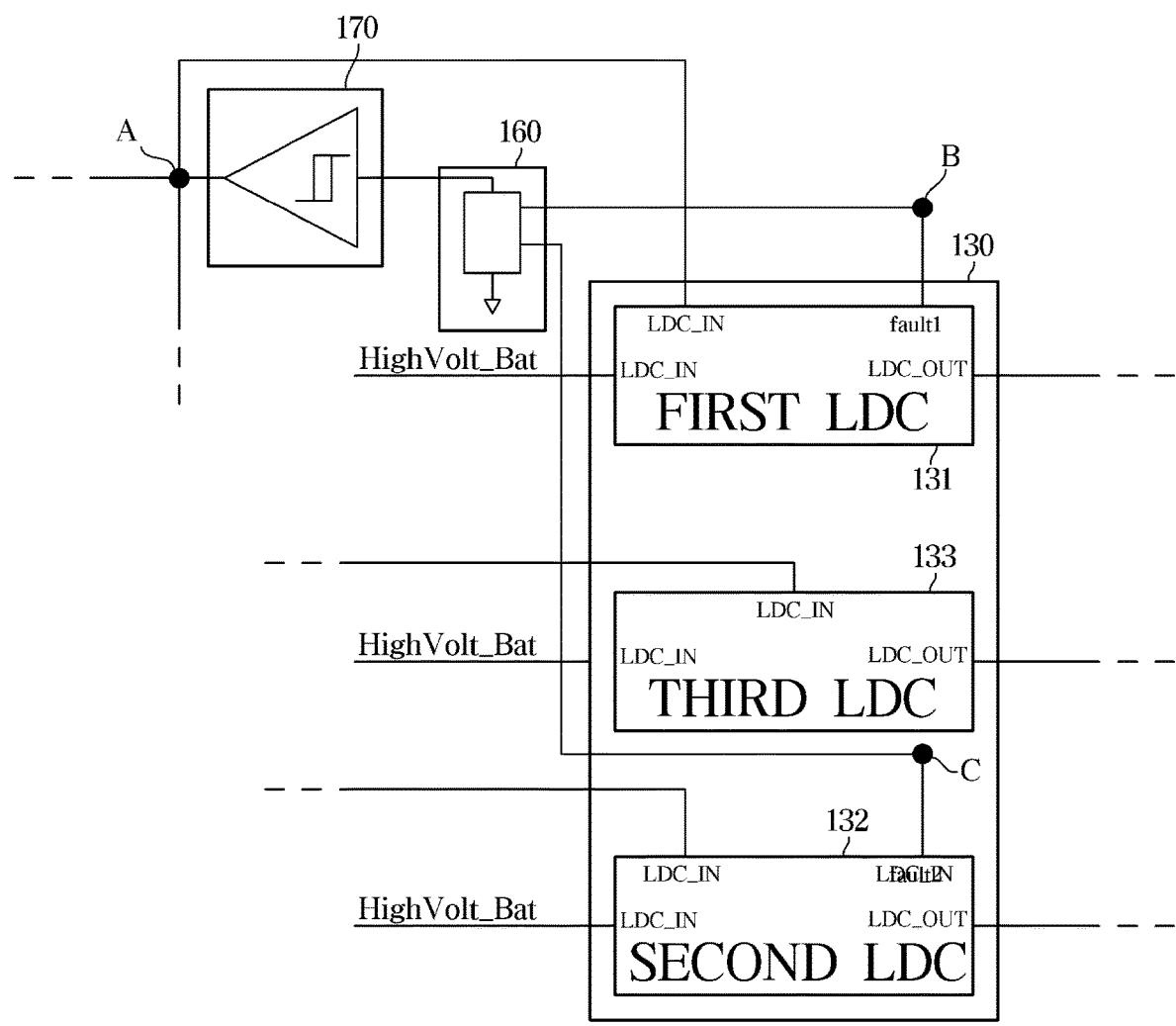
FIGS. 6 and 7 are diagrams for describing an operation of an apparatus for controlling a battery circuit.
Figure 7:
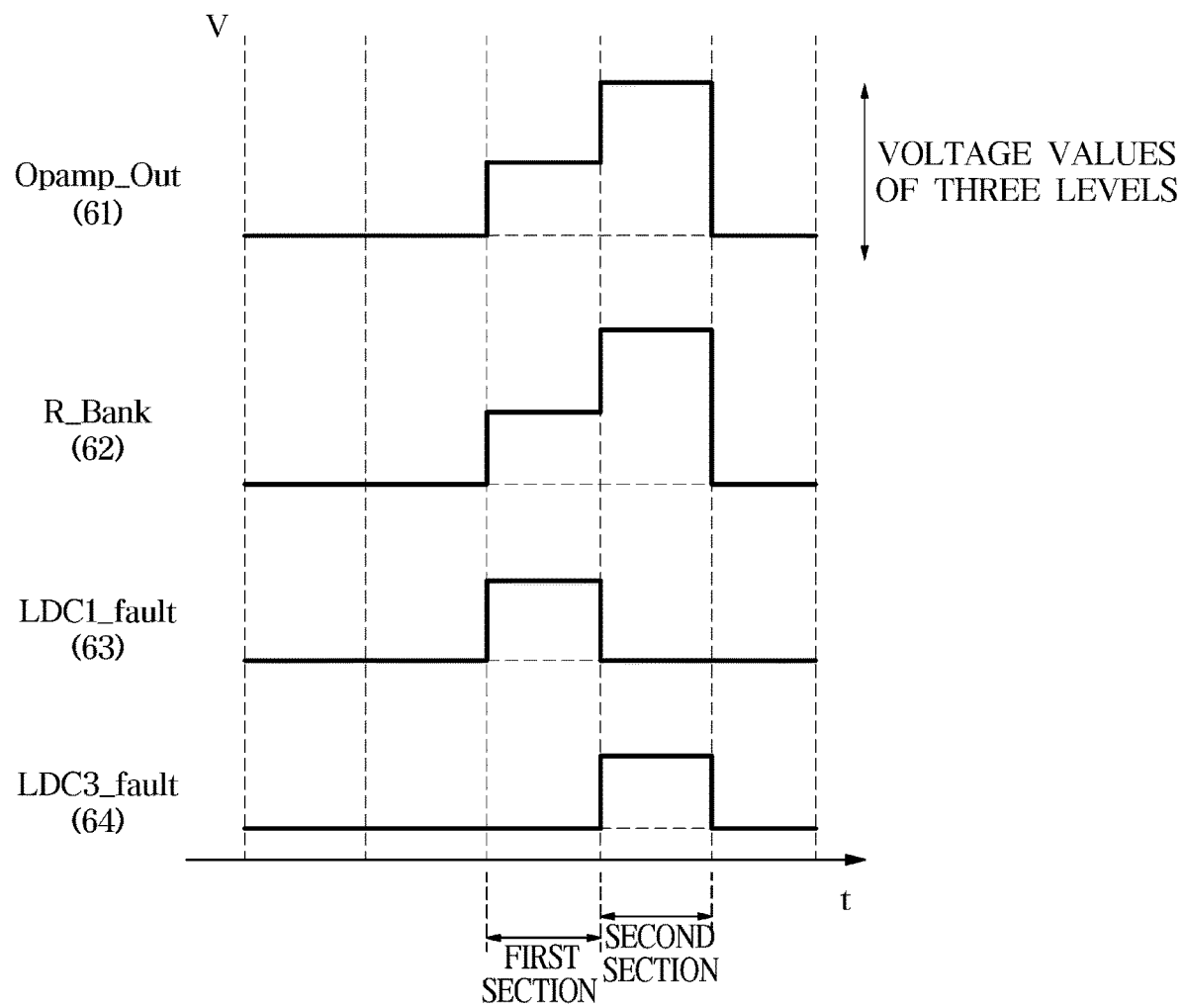

FIGS. 6 and 7 are diagrams for describing an operation of an apparatus for controlling a battery circuit.

Referring to FIGS. 6 and 7, the composite resistor 160 may output a voltage, of which the magnitude varies according to an input signal. For example, an input voltage 63 at a node B of an error signal transmitted from the first LDC 131 to the controller 150 may be transmitted through the composite resistor 160 and the output circuit 170. In this case, the value of the composite resistor 160 is changed according to the input voltage 63 at the node B, and accordingly, an output voltage 61 of the output circuit 170 at a node A may be output as a voltage of the first section.

A voltage 64 at a node C of an error signal transmitted from the second LDC 132 to the controller 150 may be transmitted through the composite resistor 160 and the output circuit 170. In this case, the value of the composite resistor 160 is changed according to the input voltage 64 at the node C, and accordingly, an output voltage 61 of the output circuit 170 at the node A may be output as a voltage of the second section.

The output voltage 61 of the output circuit 170 may be changed according to the position of a signal input from one of the first LDC 131 and the second LDC 132, and therefore, the output voltage 61 of the output circuit 170 may be output a voltage according to total of three sections.

The above-described example is not limited to the third example of implementation, and according to another example of implementation, the sections of the output voltage may be changed by increasing the number of LDCs for which a failure detection circuit is configured. For example, if the number of LDCs for which a failure is to be detected is four, the output voltage may have five sections. However, aspects of the disclosure are not limited thereto.

Figure 8:
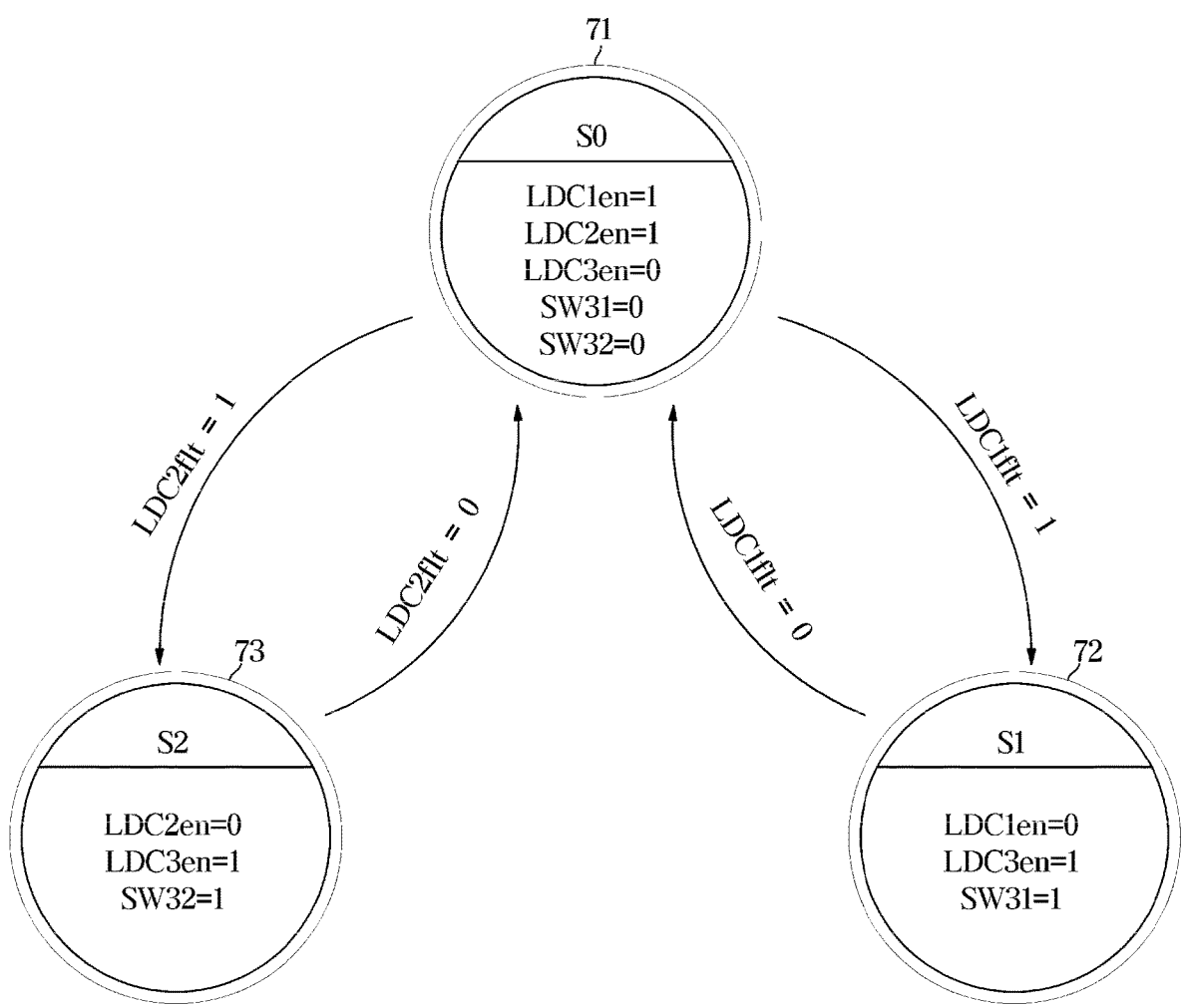
FIG. 8 is a view for describing a state diagram illustrating an operation in a failure of a low voltage DC-DC converter (LDC) of an apparatus for controlling a battery circuit.

FIG. 8 is a view for describing a state diagram illustrating an operation in case of a low voltage DC-DC converter (LDC) failure of an apparatus for controlling a battery circuit.

Referring to FIG. 8, a state S0 71 may represent a state in which the first LDC 131 and the second LDC 132 are normally operated, and the third LDC 133 is in an idle state. In this case, the switches SW31 and SW32 included in the third switch 143 may represent an off state.

In the state S0 71, the controller 150 may, upon receiving a failure signal of the first LDC 131, transition to a state S1 72.

In the state S1 72, the first LDC 131 may represent an idle state, and the second LDC 132 and the third LDC 133 may represent a normal operation state. In this case, the switch SW31 included in the third switch 143 may be in an on state, and the switch SW32 may represent a state maintained to be off.

If the controller 150 controls transition to the state S1 72 in response to receiving the failure signal of the first LDC 131, the controller 150 may generate a control signal for turning on the switch SW31 included in the third switch 143 and generate a control signal for turning on the operation of third LDC 133 and turning off the operation of the first LDC 131.

In the state S1 72, the controller 150 may, in response to a failure signal of the first LDC 131 not being received, control transition to the state S0 71.

In this case, the controller 150 may generate a control signal for turning on the operation of the first LDC 131, generate a control signal for turning off the switches SW31 and SW32, and generate a control signal for turning off the operation of the third LDC 133.

In the state S0 71, the controller 150 may, in response to a failure signal of the second LDC 132 being received, control transition to a state S2 73.

In the state S2 73, the second LDC 132 may represent an idle state, and the first LDC 131 and the third LDC 133 may be in a normal operation state. In this case, the switch SW32 included in the third switch 143 may be in an on state, and the switch SW31 may represent a state maintained to be off.

The controller 150 may, based on transition to the state S2 73 in response to a failure signal of the second LDC 132 being received, generate a control signal for turning on the switch SW32 included in the third switch 143, and a control signal for turning on the operation of the third LDC 133 and turning off the operation of the second LDC 132.

In the state S2 73, the controller 150 may, in response to a failure signal of the second LDC 132 not being received, control transition to the state S0 71.

In this case, the controller 150 may generate a control signal for turning on the operation of the second LDC 132, generate a control signal for turning off the switches SW31 and SW32, and generate a control signal for turning off the third LDC 133.

Figure 9:
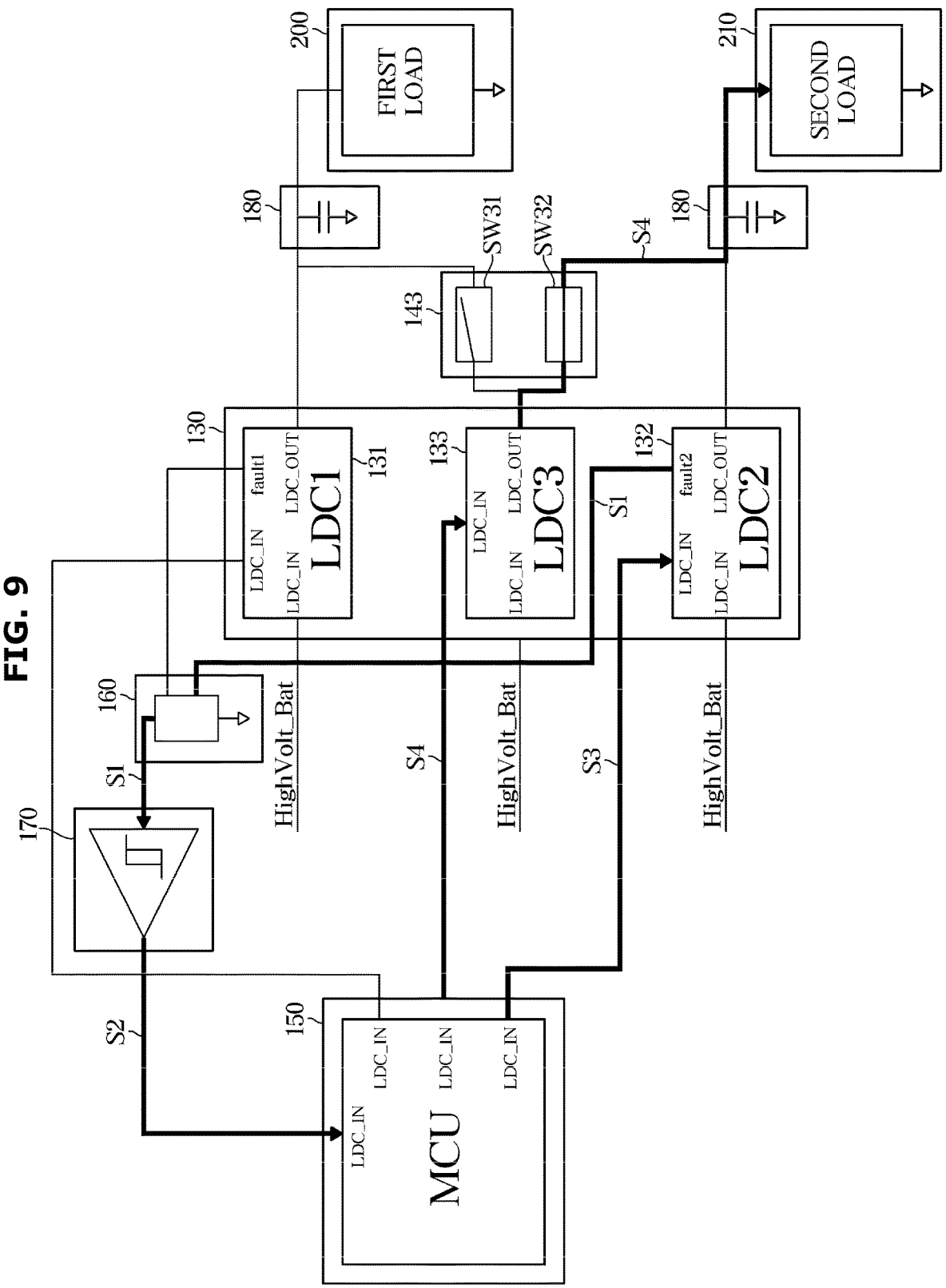
FIG. 9 is a view for describing an operation according to an LDC failure situation of an apparatus for controlling a battery circuit.

FIG. 9 is a view for describing an operation according to an LDC failure situation of an apparatus for controlling a battery circuit. FIG. 9 may be a conceptual diagram illustrating a control flow in a state in which the second LDC 132 fails.

If the apparatus 100 for controlling a battery circuit operates normally, the first LDC 131 may supply a voltage to the first load 200, and the second LDC 132 may supply a voltage to the second load 210.

If the second LDC 132 fails, the second LDC 132 may transmit a signal to the output circuit 170 through the composite resistor 160 (S1).

The output circuit 170 may output a voltage corresponding to the received failure signal of the second LDC 132 to the controller 150 (S2).

The controller 150 may generate a control signal for turning off the operation of the second LDC 132 (S3).

The controller 150 may generate a control signal for turning on the operation of the third LDC 133 and control the switch SW32 of the third switch 143 to be turned on (S4).

A voltage input from the battery 120 may be dropped through the third LDC 133 and a dropped voltage may be input to the second load 210 (e.g., to compensate the voltage previously provided by the second LDC 132).

A voltage generated by performing operations S1 to S4, which is not supplied to the second load 210 through the second LDC 132, may be supplied to the second load 210 through the power storage 180. Accordingly, the apparatus 100 for controlling a battery circuit may provide supply of voltage without interruption even when the LDC 130 fails, thereby improving the stability.

Figure 10:
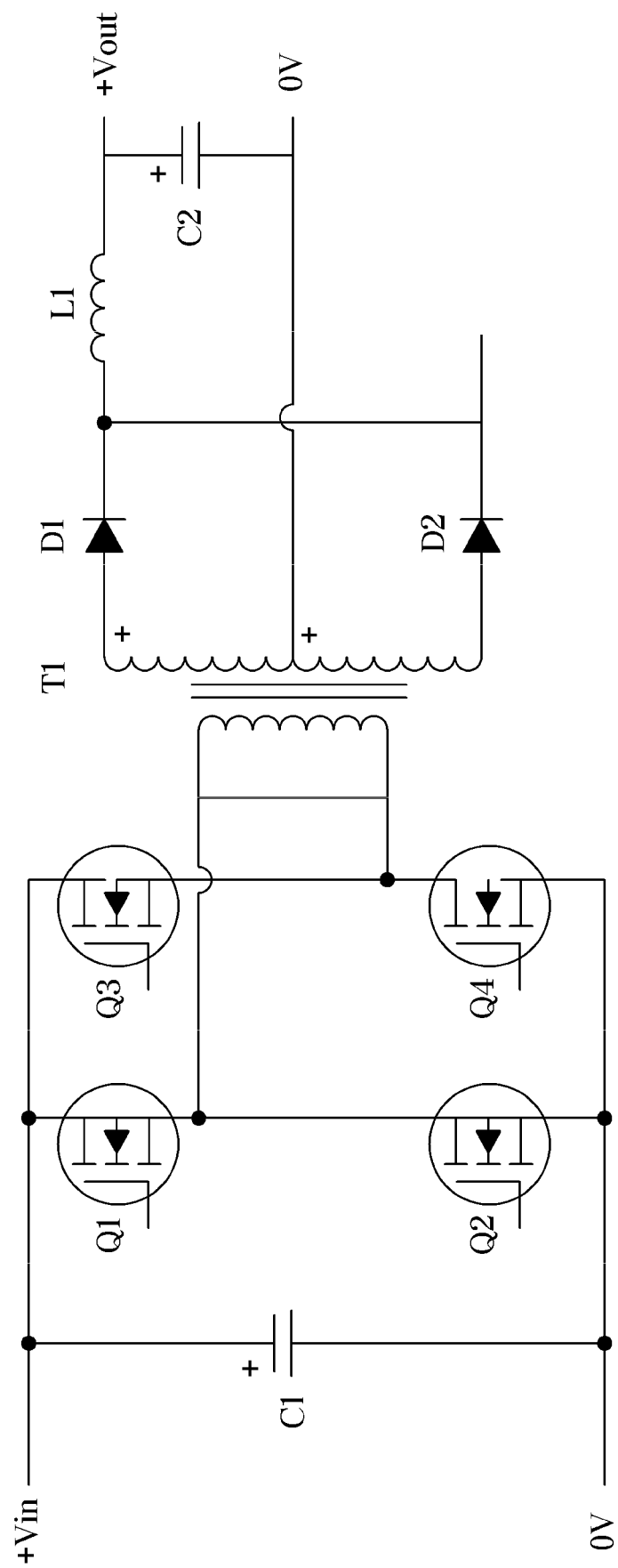
FIG. 10 is an LDC circuit diagram for adjusting an LDC output voltage of an apparatus for controlling a battery circuit.

FIG. 10 is an LDC circuit diagram for adjusting an LDC output voltage of an apparatus for controlling a battery circuit.

Referring to FIG. 10, the controller 150 may control the duty rate of the voltage input from the battery 120 to adjust the output voltage of the LDC circuit. The controller 150 may adjust the duty rate to output an output voltage at a first voltage (e.g., 24V or any other voltage) corresponding to the first load 200 or at a second voltage (e.g., 12V or any other voltage) corresponding to the second load 210.

The voltage output from the LDC 130 may be calculated based on Equation 1.

$$V_{out} = 2 \times V_{in} \frac{N_2}{N_1} \times d \qquad \text{[Equation 1]}$$

Here, $V_{out}$ may denote an output voltage, $V_{in}$ may denote an input voltage received from a battery, $N_2$ and $N_1$ may denote the number of windings of an input coil and an output coil, respectively, and d may denote a duty rate. Meanwhile, d may be limited to 0 to 0.5 in consideration of the short circuit and maximum power transfer.

For example, the controller 150 needs to adjust the duty rate to be smaller when the third LDC 133 supplies the voltage to the second load 210 compared to when the third LDC 133 supplies the voltage to the first load 200.

Various examples and features of the apparatus 100 for controlling a battery circuit have been described above. Hereinafter, a method of controlling a battery circuit will be described. The method of controlling a battery circuit may be performed by the apparatus 100 for controlling a battery circuit. Accordingly, the description of the method of controlling a battery circuit described below may be equally applied to the description of the apparatus 100 for controlling a battery circuit and/or the vehicle having the same.

Figure 11:
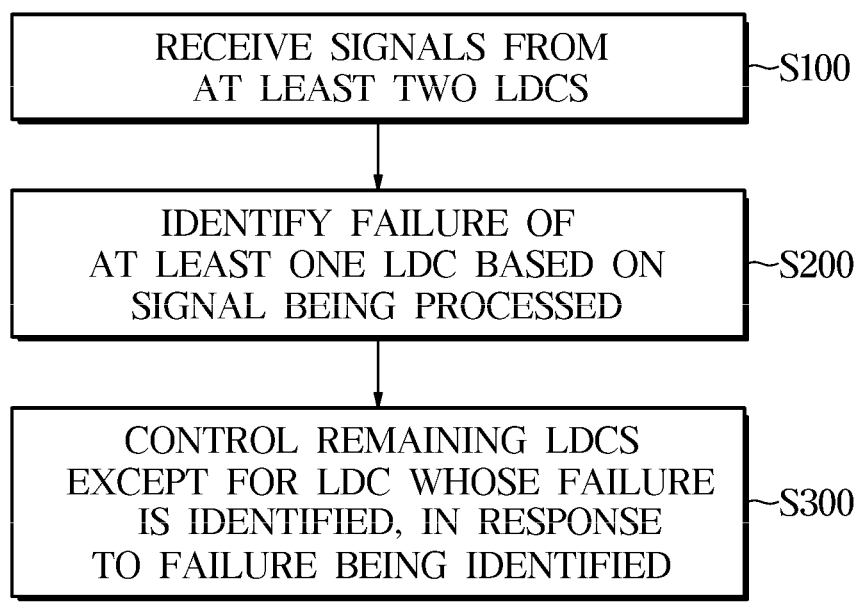
FIG. 11 is a flowchart for describing a method of controlling a battery circuit.

FIG. 11 is a flowchart for describing a method of controlling a battery circuit.

Referring to FIG. 11, the apparatus 100 for controlling a battery circuit may receive signal(s) from at least one of a plurality of LDCs 130 (S100).

The apparatus 100 for controlling a battery circuit may, based on the signal(s) received from the LDC 130 being processed, identify a failure of at least one LDC 130 (S200).

The apparatus 100 for controlling a battery circuit may, in response to a failure being identified through operation S200, control the remaining LDCs except for the LDC, of which a failure is identified (S300).

According to an aspect of the disclosure, there is provided an apparatus for controlling a battery circuit, the apparatus including: a power supply including at least one battery, and at least two low voltage DC-DC Converters (LDCs) electrically connected to the battery and configured to drop an input voltage and supply the voltage to one of a first load and a second load; and a controller including a processor configured to process a signal received from the LDC, wherein the controller is configured to, based on the signal received from the LDC being processed, identify a failure of at least one of the LDCs; and in response to the failure being identified, control a LDC other than the LDC, of which the failure is identified.

The power supply may include: first to third LDCs; and switches, each of which is connected between a corresponding one of the LDCs and the first load and the second load, wherein the controller is configured to, in response to the failure being identified, operate the third LDC in an idle state and control the switch for the third LDC to be connected to one of the first load and the second load.

The power supply may include: a first LDC for supplying a voltage to the first load, a second LDC for supplying a voltage to the second load, and a third LDC in an idle state; and a switch connected between the third LDC and the first load and the second load, wherein the controller is configured to, in response to a failure of one of the first LDC and the second LDC being identified, operate the third LDC and control the switch for the third LDC to be connected to the one of the first load and the second load.

The power supply may include: a first LDC configured to supply a voltage to a load having a preset high priority among the first loads, a second LDC configured to supply a voltage to the second load, and a third LDC configured to supply a voltage to a load having a preset low priority among the first loads; and a switch connected between the third LDC and the first load and the second load, wherein the controller may be configured to, in response to a failure of the second LDC being identified, control the third LDC to supply a voltage to the second load.

The controller may be configured to, in response to a failure of the first LDC being identified, generate a control signal to operate the third LDC, turn on a switch connected between the third LDC and the first load, and turn off a switch connected between the third LDC and the second load.

The controller may be configured to, in response to a failure of the second LDC being identified, generate a control signal to operate the third LDC, turn off a switch connected between the third LDC and the first load, and turn on a switch connected between the third LDC and the second load.

The power supply may further include a power storage unit provided at a voltage input terminal of each of the first load and the second load.

The power supply may further include an amplifier configured to receive the signal received from the LDC as input, and output the signal to the controller, wherein the amplifier further may include a positive feedback comparator.

The controller may be configured to generate a control signal to change a duty rate of the input voltage of the LDC according to a type of a load.

According to an aspect of the disclosure, there is provided a method of controlling a battery circuit including a power supply and a controller, the method including: receiving signals from at least two low voltage DC-DC Converters (LDCs); based on the signal being processed, identifying a failure of at least one of the LDCs; and in response to the failure being identified, controlling a LDC other than the LDC, of which the failure is identified.

According to an aspect of the disclosure, there is provided a vehicle including the apparatus for controlling a battery circuit.

As is apparent from the above, an apparatus and method for controlling a battery circuit of a vehicle may provide stable operation controls when a failure of at least one LDC occurs.

An apparatus and method for controlling a battery circuit of a vehicle may be capable of providing a fail operational system of an autonomous driving eco-friendly vehicle by duplicating a power supply circuit.

An apparatus and method for controlling a battery circuit of a vehicle may be capable of minimizing cost rise due to a circuit redundancy configuration by optimizing a circuit transition between a normal operation state and a failure occurrence state and a configuration of components.

An apparatus and method for controlling a battery circuit of a vehicle may be capable of reinforcing a fail operational system of an autonomous driving eco-friendly vehicle through a redundancy configuration of a power supply circuit.

An apparatus and method for controlling a battery circuit of a vehicle may enable travelling to a destination without occupant's intervention even when electronic parts of an autonomous driving eco-friendly vehicle have a failure.

Various features and/or configurations described herein may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The program may include code coded in a computer language, such as C, C++, Java, another machine language, etc., that may be read by a processor (e.g., a central processing unit (CPU)) of a computer through a device interface of the computer in order for the computer to read the program and execute the methods implemented as the program. The code may include functional code that is related to a function that defines functions needed to execute the methods and may include execution procedure-related control code needed to cause the processor of the computer to execute the functions according to a predetermined procedure. The code may further include memory reference-related code indicating a position (an address) of an internal or external memory of the computer where additional information or media needed to cause the processor of the computer to execute the functions should be referenced. In addition, when the processor of the computer needs to communicate with any other computer or server, etc. at a remote site, to perform the above-described functions, the code may further include communication-related code such as how to communicate with any other computer or server at a remote site and what information or media should be transmitted or received during communication.

The operations of the method or algorithm described in connection with the embodiment of the present disclosure may be implemented directly in hardware, implemented in a software module executed by hardware, or implemented in a combination thereof. Software modules may reside in a RAM, a ROM, an Erasable Programmable ROM (EPROM), an Electrically Erasable Programmable ROM (EEPROM), a flash memory, a hard disk, a removable disk, a CD-ROM, or any other form of computer-readable recording medium known in the art to which the present disclosure pertains.

Although various examples of the present disclosure have been described for illustrative purposes, those skilled in the art will appreciate that various modifications, additions and substitutions are possible, without departing from the scope and spirit of the disclosure. Therefore, embodiment(s) of the present disclosure have not been described for limiting purposes.

What is claimed is:

1. An apparatus comprising:
    a power supply comprising at least one battery and a plurality of low voltage DC-DC converters (LDCs), wherein each of the plurality of LDCs is electrically coupled to the battery and is configured to drop a voltage and to supply the dropped voltage to one of a plurality of loads, wherein the plurality of loads comprises a first load and a second load; and
    a controller configured to:
        receive a signal from at least one of the plurality of LDCs;
        based on the signal received from the at least one of the plurality of LDCs, identify a failure associated with the at least one of the plurality of LDCs; and
        based on the identified failure, control an additional LDC other than the plurality of LDCs to supply power to a load of the plurality of loads that is associated with the at least one of the plurality of LDCs.

2. The apparatus of claim 1, wherein the power supply comprises:
    a first switch connected between the first load and a first LDC of the plurality of LDCs;
    a second switch connected between the second load and a second LDC of the plurality of LDCs; and
    a third switch,
    wherein the controller is configured to:
    based on the identified failure, control the third switch to electrically couple the additional LDC to the first load or the second load.

3. The apparatus of claim 1, wherein the plurality of LDCs comprises a first LDC for supplying a voltage to the first load, a second LDC for supplying a voltage to the second load, and the additional LDC in an initially idle state;
    wherein the apparatus comprises a switch; and
    wherein the controller is configured to:
    based on an identified failure of one of the first LDC and the second LDC, control the switch to electrically couple the additional LDC to the one of the first load and the second load.

4. The apparatus of claim 1, wherein the plurality of LDCs comprises a first LDC configured to supply a voltage to the first load and a second LDC configured to supply a voltage to the second load,
    wherein the additional LDC is configured to supply a voltage to a third load;
    wherein the apparatus comprises a switch; and
    wherein the controller is configured to control the additional LDC by:
    based on an identified failure of the second LDC, controlling the additional LDC to supply a voltage to the second load.

5. The apparatus of claim 3, wherein the controller is configured to:
    based on an identified failure of the first LDC, generate a control signal to turn on a first switch element of the switch connected between the additional LDC and the first load, and to turn off a second switch element of the switch connected between the additional LDC and the second load.

6. The apparatus of claim 3, wherein the controller is configured to:
    based on an identified failure of the second LDC, generate a control signal to turn off a first switch element of the switch connected between the additional LDC and the first load, and to turn on a second switch element of the switch connected between the additional LDC and the second load.

7. The apparatus of claim 1, wherein the power supply further comprises:
    a power storage provided at a voltage input terminal of each of the first load and the second load.

8. The apparatus of claim 1, wherein the power supply further comprises:
    an amplifier configured to receive the signal received from the at least one of the plurality of LDCs as an input, and to output an output signal to the controller, wherein the amplifier comprises a positive feedback comparator.

9. The apparatus of claim 1, wherein the controller is configured to:

generate, based on a type of the first load or the second load, a control signal to change a duty rate of an input voltage of an LDC of the plurality of LDCs.

10. A method comprising:
receiving at least one signal from a plurality of low voltage DC-DC converters (LDCs);
based on the at least one signal, identifying a failure of at least one of the plurality of LDCs; and
based on the identified failure, controlling, by a controller, an additional LDC other than the plurality of LDCs to supply power to a load associated with the at least one of the plurality of LDCs.

11. The method of claim 10, further comprising:
based on the identified failure, controlling a switch to electrically couple the additional LDC to the load.

12. The method of claim 10, further comprising:
supplying a voltage from a first LDC of the plurality of LDCs to the load;
supplying a voltage from a second LDC of the plurality of LDCs to a second load;
operating the additional LDC in an initially idle state; and
based on an identified failure of one of the first LDC and the second LDC, controlling a switch to electrically couple the additional LDC to the one of the load and the second load.

13. The method of claim 10, further comprising:
supplying a voltage from a first LDC of the plurality of LDCs to the load;
supplying a voltage from a second LDC of the plurality of LDCs to a second load;
supplying a voltage from the additional LDC to a third load; and
based on an identified failure of the second LDC, controlling the additional LDC to supply a voltage to the second load.

14. The method of claim 12, further comprising:
based on an identified failure of the first LDC, generating a control signal to turn on a first switch element of the switch connected between the additional LDC and the load, and to turn off a second switch element of the switch connected between the additional LDC and the second load.

15. The method of claim 12, further comprising:
based on an identified failure of the second LDC, generating a control signal to turn off a first switch element of the switch connected between the additional LDC and the load, and to turn on a second switch element of the switch connected between the additional LDC and the second load.

16. The method of claim 10, further comprising:
providing, by a power storage, power to the load via an input terminal of the load.

17. The method of claim 10, further comprising:
receiving, by an amplifier, the at least one signal as an input; and
outputting, by the amplifier, an output signal to the controller,
wherein the amplifier comprises a positive feedback comparator.

18. The method of claim 10, further comprising generating, based on a type of the load, a control signal to change a duty rate of an input voltage of the at least one of the plurality of LDCs.

* * * * *